US006994269B2

(12) United States Patent
Lien

(10) Patent No.: US 6,994,269 B2
(45) Date of Patent: Feb. 7, 2006

(54) WATER SUPPLY DEVICE FOR OUTDOOR ACTIVITIES

(75) Inventor: Chien-Ping Lien, Taipei Hsien (TW)

(73) Assignee: Taiwan Vertex Production Corp., Taipei Hsien (TW)

( * ) Notice: Subject to any disclaimer, the term of this patent is extended or adjusted under 35 U.S.C. 154(b) by 0 days.

(21) Appl. No.: 10/897,023

(22) Filed: Jul. 23, 2004

(65) Prior Publication Data

US 2005/0263610 A1 Dec. 1, 2005

(30) Foreign Application Priority Data

May 17, 2004 (TW) ................................. 93207745

(51) Int. Cl.
*B05B 12/14* (2006.01)

(52) U.S. Cl. ............................ 239/24; 239/16; 239/71; 239/581.1; 239/588; 239/602; 222/175; 222/490; 220/703; 224/148.2

(58) Field of Classification Search .................. 239/16, 239/24–27, 71, 152, 302, 581.1, 587.5, 588, 239/602; 222/175, 490; 220/703, 705, 713, 220/714; 224/148.2
See application file for complete search history.

(56) References Cited

U.S. PATENT DOCUMENTS

| | | | | |
|---|---|---|---|---|
| 1,096,021 | A * | 5/1914 | Day | 239/26 |
| 1,336,401 | A * | 4/1920 | Doucette | 239/25 |
| 3,032,272 | A * | 5/1962 | Nesky | 239/24 |
| 3,108,748 | A * | 10/1963 | Fiore | 239/25 |
| 3,410,487 | A * | 11/1968 | Hyde | 239/26 |
| 5,806,726 | A * | 9/1998 | Ho | 222/175 |
| 6,497,348 | B2 * | 12/2002 | Forsman et al. | 224/148.2 |
| 6,742,681 | B1 * | 6/2004 | Yang | 222/490 |

* cited by examiner

*Primary Examiner*—Steven J. Ganey
(74) *Attorney, Agent, or Firm*—Bacon & Thomas PLLC

(57) ABSTRACT

A water supply device includes a pipe connected between a water reservoir and a connector which has an opening defined through a wall thereof. A mouth mount has a first end connected to a valve which is rotatably inserted in the connector. The valve includes a hole defined in a wall thereof and the hole can be adjusted to communicate with the opening by rotating the mouth mount. A slit is defined through a second end of the mouth mount so that the user may deform the slit into a hole to suck water from the reservoir.

5 Claims, 5 Drawing Sheets

WATER SUPPLY DEVICE FOR OUTDOOR ACTIVITIES

FIELD OF THE INVENTION

The present invention relates to a water supply device having a mouth mount rotatably connected to a valve so that the user may suck liquid via the mouth mount at convenient angles.

BACKGROUND OF THE INVENTION

A conventional water supply device for supplying water to the users who are able to grasp a bottle of water generally includes water tank which can be a bladder or a tank with a fixed shape, a pipe connected to the tank, and a mouth mount which is connected to the pipe and includes an opening through which water can be sucked therethrough and enters into the user's mouth. Generally, a connector is connected between the mouth mount and the pipe so that the mouth mount is fixed to the connector at a specific angle. In other words, the user has to adjust the position of his or her mouth at a specific position to access the mouth mount. This is not convenient for the some users who are not allowed to remove his or her eyes toward a specific direction, such as the cyclists. Besides, in order to have a seal feature, the mouth mount is cut a slit so that when the user wants to get water, he or she exerts a force to deform the mouth mount so as to enlarge the slit so as to allow water to flow therethrough. Nevertheless, when the mouth mount is squeezed unintentionally during actions, the slit is enlarged and the water leaks.

The present invention intends to provide a water supply device wherein the mouth mount is rotatably connected to a valve so that the user can get water from different positions.

SUMMARY OF THE INVENTION

The present invention relates to a water supply device which comprises a pipe connected between a water reservoir and a connector 1 which includes a tube with a connection fitting extending therefrom so as to be inserted in the pipe. An opening is defined through a wall of the valve and communicates with the pipe via the connection fitting. A mouth mount is connected to a valve which is rotatably inserted in the connector. A passage is defined through the valve and a slit is defined through a distal end of the mouth mount. The user may deform the slit into a hole to suck water therefrom. A hole is defined in a wall of the valve and is moved to be in communication with the opening by rotating the mouth mount such that water can be sucked from the reservoir.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
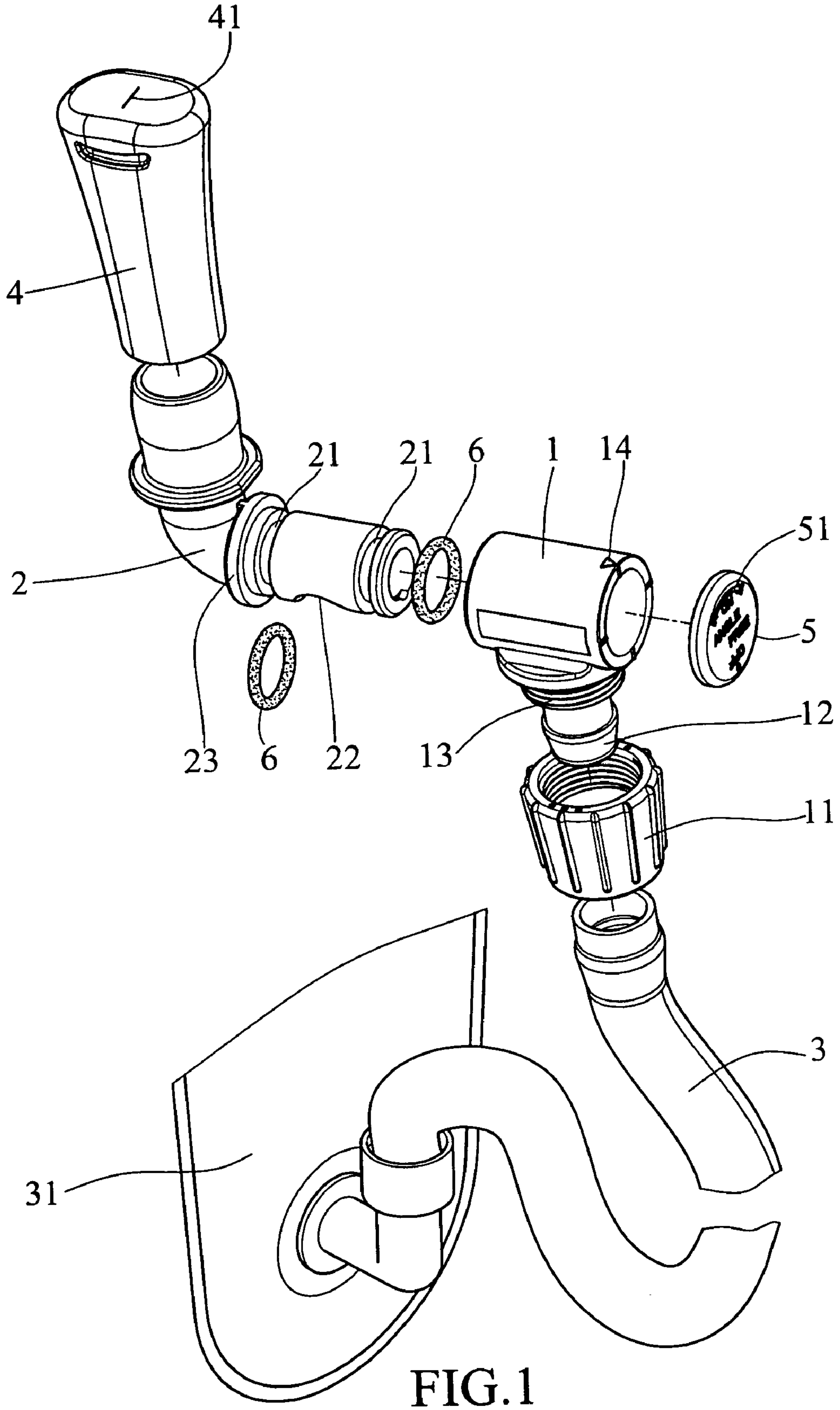
FIG. 1 is an exploded view to show the water supply device of the present invention.
Figure 2:
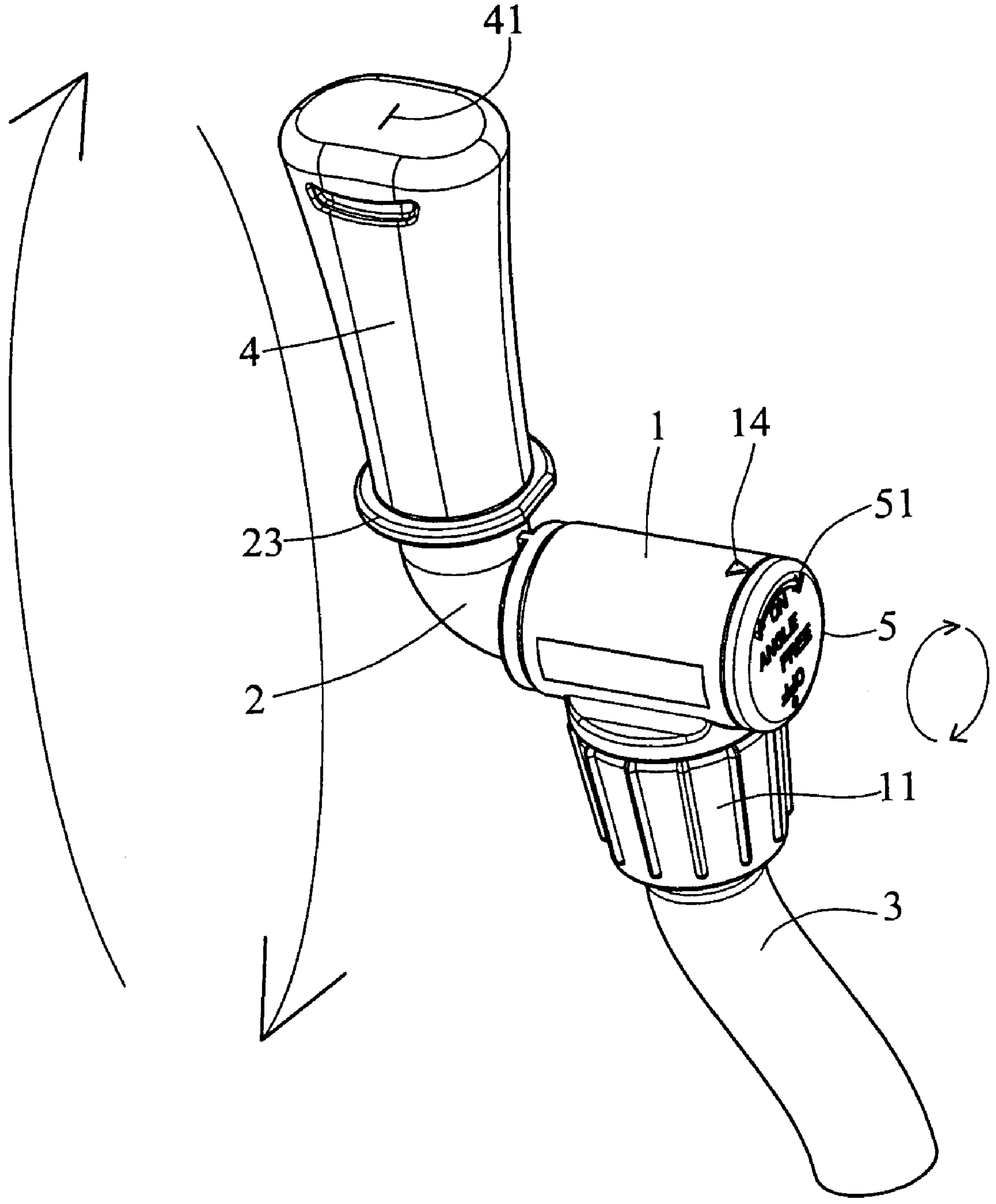
FIG. 2 is a perspective view to show the water supply device of the present invention.
Figure 3:
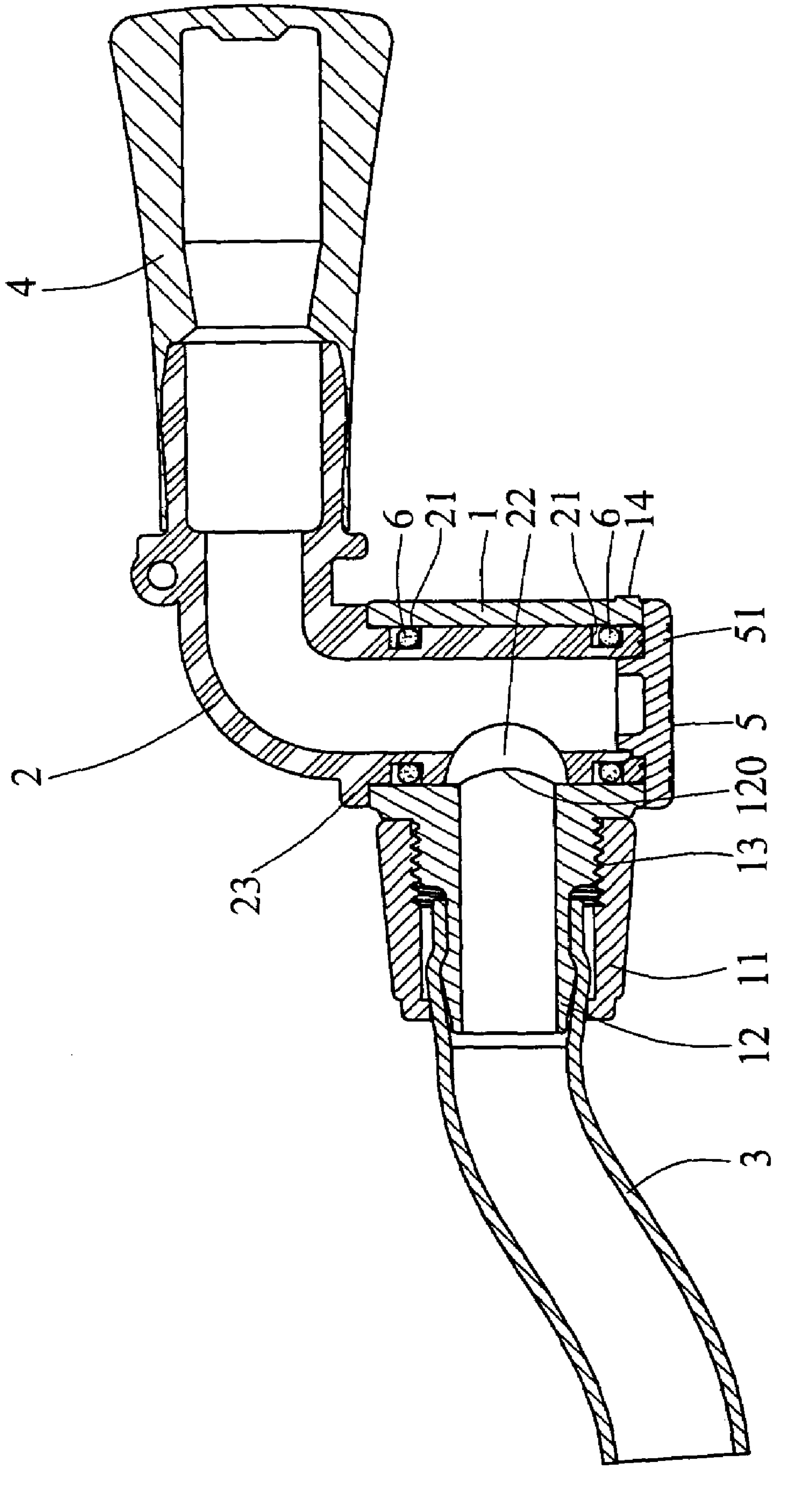
FIG. 3 shows the opening of the connector is in communication with the hole of the valve.

Referring to FIGS. 1 to 3, the water supply device of the present invention comprises a flexible pipe 3 having a first end thereof connected to a water reservoir 31 and a connector 1 connected to a second end of the pipe 3. The connector 1 includes a tube and a connection fitting 12 extends radially therefrom which is inserted in the second end of the pipe 3. The connection fitting 12 includes a threaded outer periphery 13 and a threaded securing collar 11 is connected to the threaded outer periphery 13 and connected to the second end of the pipe 3. An opening 120 is defined through a wall of the connector 1 and communicates with the second end of the pipe 3 via the connection fitting 12.

A mouth mount 4 has a first end connected to a first end of an L-shaped valve 2 and a second end of the mouth mount 4 has a slit 41 defined therethrough. It is known that the mouth mount 4 is made of flexible material so that when the user exerts a force to squeeze the mouth mount 4, the slit 41 is deformed in to a hole through which water flows into the user's mouth. A second end of the valve 2 rotatably is inserted in the connector 1 and a passage is defined through the valve 2. A hole 22 is defined in a wall of the valve 2 and is movably in communication with the opening 120. Several seals 6 are engaged with grooves 21 defined in an outer periphery of the section of the valve 2 in the connector 1 so as to prevent leakage. A flange 23 extends radially outward from the valve 2 and is in contact with an end of the connector 1. The second end of the valve 2 is connected to a plate 5 which is rotatably located outside of the connector 1 and has "ON" and "OFF" marks 51 marked on an outside thereof. The plate 5 rotates with the rotation of the valve 2. The connector 1 includes a notch 14 defined in an end thereof so that the user may check the status of the water supply device by checking the alignment of the marks 51 and the notch 14. The user may rotate the mouth mount 4 to move the hole 22 to communicate with the opening 120 when he or she wants to get some water as shown in FIG. 3, the "ON" mark 51 is in alignment with the notch 14.

Figure 4:
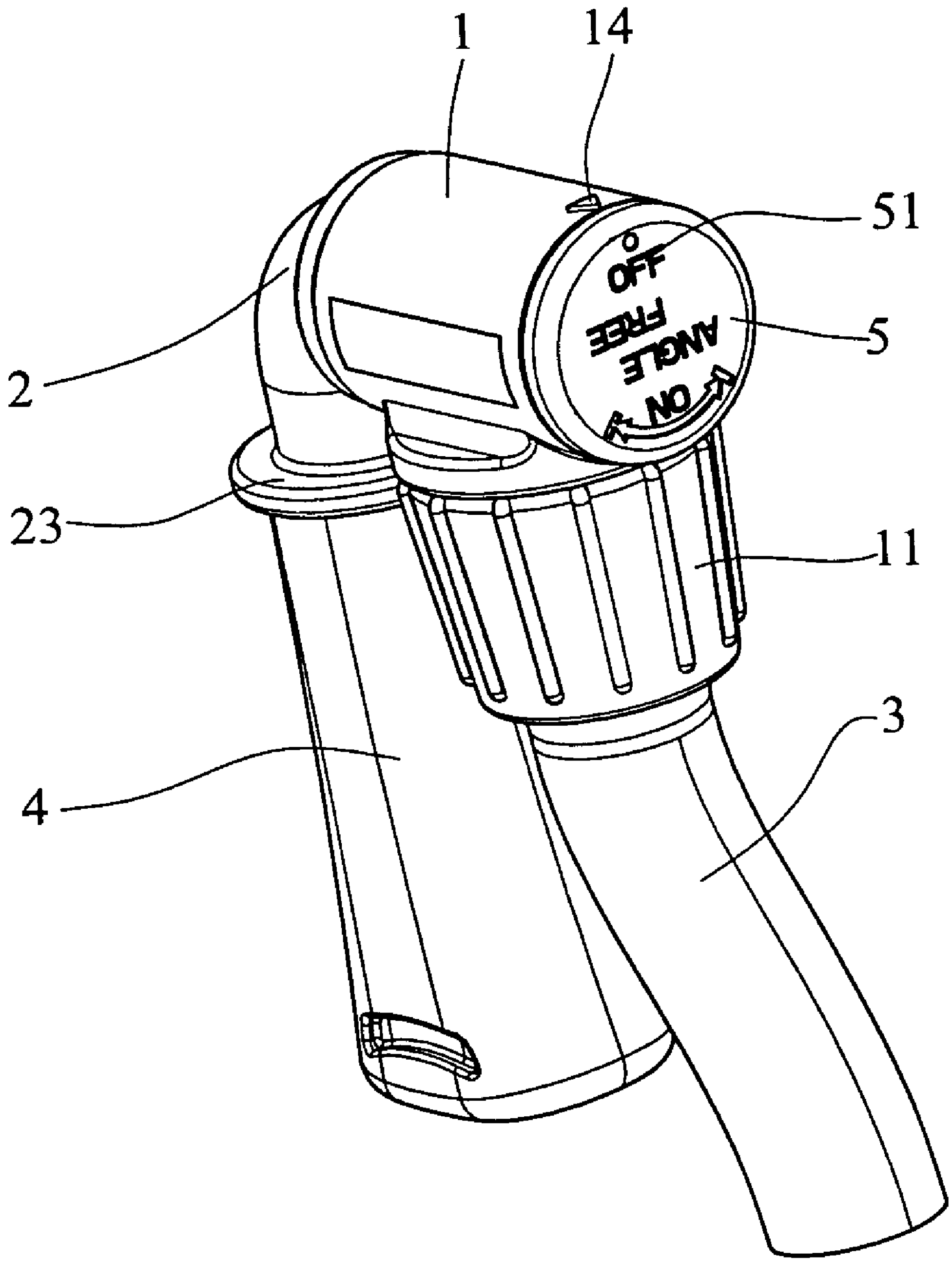
FIG. 4 shows that the mark of "OFF" on the plate is in alignment with the notch of the connector.
Figure 5:
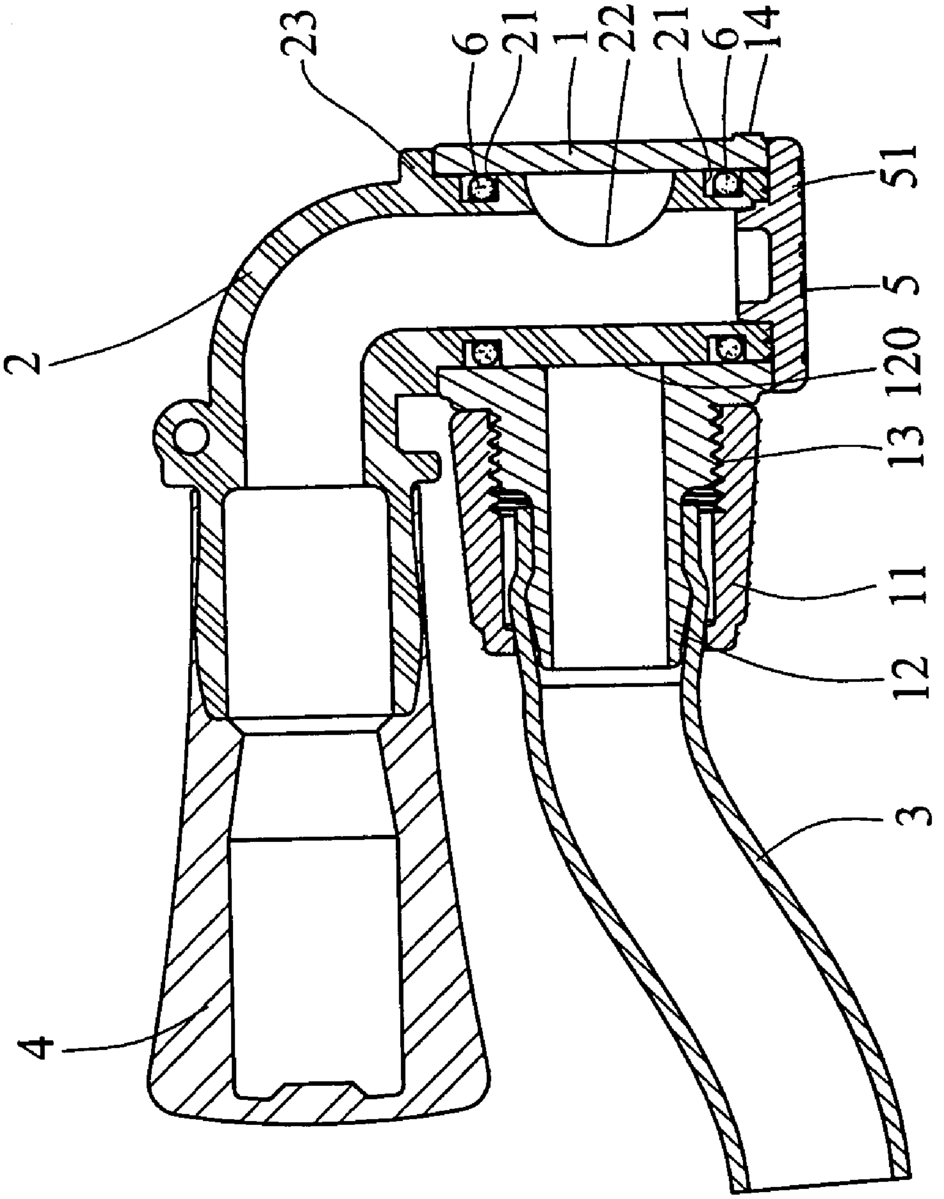
FIG. 5 shows a cross sectional view of the "OFF" position in FIG. 4.

Referring to FIGS. 4 and 5, when rotating the mouth mount 4 and the valve 2 to another position, the hole 22 is moved away from the opening 120 which is then sealed by the wall of the valve 2, the water cannot be sucked and the "OFF" mark 51 is in alignment with the notch 14.

While we have shown and described the embodiment in accordance with the present invention, it should be clear to those skilled in the art that further embodiments may be made without departing from the scope of the present invention.

What is claimed is:

1. A water supply device comprising:

a pipe having a first end thereof connected to a water reservoir and a connector connected to a second end of the pipe, the connector including a tube with a connection fitting extending therefrom which is inserted in the second end of the pipe, an opening defined through a wall of the connector and communicating with the second end of the pipe via the connection fitting, and a mouth mount having a first end connected to a first end of a valve and a second end of the mouth mount having a slit defined therethrough, a second end of the valve rotatably inserted in the connector and a passage defined through the valve, a hole defined in a wall of the valve and being moved to be in communication with the opening.

2. The device as claimed in claim 1, wherein the second end of the valve is connected to a plate which has a mark marked on an outside thereof, the connector including a notch defined in an end thereof, the hole being in communication with the opening when the mark is located in alignment with the notch.

3. The device as claimed in claim 2, wherein a flange extends radially outward from the valve and is in contact with an end of the connector.

4. The device as claimed in claim 1, wherein the connection fitting includes a threaded outer periphery and a threaded securing collar is connected to the threaded outer periphery and connected to the pipe.

5. The device as claimed in claim 1, wherein the valve is an L-shaped member.

* * * * *